United States Patent
Matsumura et al.

(10) Patent No.: US 12,010,700 B2
(45) Date of Patent: *Jun. 11, 2024

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 366 days.

This patent is subject to a terminal disclaimer.

(21) Appl. No.: 17/432,777

(22) PCT Filed: Feb. 22, 2019

(86) PCT No.: PCT/JP2019/006900
§ 371 (c)(1),
(2) Date: Aug. 20, 2021

(87) PCT Pub. No.: WO2020/170449
PCT Pub. Date: Aug. 27, 2020

(65) Prior Publication Data
US 2022/0007406 A1 Jan. 6, 2022

(51) Int. Cl.
*H04W 72/23* (2023.01)
*H04B 7/06* (2006.01)
(Continued)

(52) U.S. Cl.
CPC .......... *H04W 72/23* (2023.01); *H04B 7/0602* (2013.01); *H04L 5/0048* (2013.01); *H04W 72/1273* (2013.01)

(58) Field of Classification Search
CPC ................. H04W 72/23; H04W 72/1273; H04B 7/0602; H04B 7/088; H04B 7/0695; H04L 5/0048; H04L 5/0023; H04L 5/0051
See application file for complete search history.

(56) References Cited

U.S. PATENT DOCUMENTS

2019/0229792 A1* 7/2019 John Wilson ....... H04W 72/046
2022/0210812 A1 6/2022 Matsumura et al.

FOREIGN PATENT DOCUMENTS

CN 113728560 A 11/2021

OTHER PUBLICATIONS

Extended European Search Report issued in European Application No. 19916217.3 dated Aug. 29, 2022 (9 pages).
(Continued)

*Primary Examiner* — Chuong A Ngo
(74) *Attorney, Agent, or Firm* — Osha Bergman Watanabe & Burton LLP

(57) ABSTRACT

A terminal is disclosed that includes: a control section that determines, in a case where conditions (1) and (2) below are both satisfied, a quasi-co-location (QCL) assumption of an aperiodic channel state information-reference signal (AP CSI-RS), based on a control resource set (CORESET) having a specific CORESET-ID in a latest slot in which one or more CORESETs are monitored, (1) a scheduling offset between reception of a downlink control channel for communicating downlink control information scheduling the AP-CSI-RS and reception of the AP CSI-RS being less than a value of a period for a reported beam switch, and (2) in a symbol identical to a symbol of the AP-CSI-RS, there being no other downlink signals with indicated transmission configuration indication state (TCI state) or there being other downlink signals without the indicated TCI state; and a receiving section that receives the AP-CSI-RS by using the QCL assumption.

5 Claims, 7 Drawing Sheets

(51) Int. Cl.
*H04L 5/00* (2006.01)
*H04W 72/1273* (2023.01)

(56) References Cited

OTHER PUBLICATIONS

Notice of Reasons for Refusal issued in Japanese Application No. 2021-501364 dated Aug. 23, 2022 (6 pages).
Office Action issued in Japanese Application No. 2021-501364 dated Jan. 31, 2023 (6 pages).
Office Action issued in Chinese Application No. 201980095212.3 dated May 10, 2023 (14 pages).
International Search Report issued in PCT/JP2019/006900, dated Apr. 2, 2019 (4 pages).
Written Opinion of the International Searching Authority issued in PCT/JP2019/006900, dated Apr. 2, 2019 (3 pages).
ZTE; "Draft CR on default QCL for AP-CSI-RS"; 3GPP TSG RAN WG1 Meeting #96, R1-1901754; Athens, Greece; Feb. 25-Mar. 1, 2019 (3 pages).
Ericsson; "Summary of view for beam measurement and reporting—v2"; 3GPP TSG-RAN WG1 Meeting #95, Tdoc R1-1814065; Spokane, USA, Nov. 8-12, 2018 (13 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", Mar. 2010 (149 pages).
Office Action issued in Chinese Application No. 201980095212.3 dated Jan. 16, 2024 (12 pages).

* cited by examiner

USER TERMINAL AND RADIO COMMUNICATION METHOD

TECHNICAL FIELD

The present disclosure relates to a user terminal and a radio communication method in next-generation mobile communication systems.

BACKGROUND ART

In Universal Mobile Telecommunications System (UMTS) networks, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted. Successor systems of LTE (e.g., referred to as "5th generation mobile communication system (5G))," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (e.g., NR), a user terminal (User Equipment (UE)) measures a channel state by using a channel state information reference signal (CSI-RS), and feeds back (reports) channel state information (CSI) to a network (e.g., a base station).

As a CSI feedback method, an aperiodic CSI (AP-CSI) reporting has been under study. A CSI-RS measured for the AP-CSI reporting may be referred to as an AP CSI-RS (or A-CSI-RS) (Aperiodic CSI-RS).

For NR, determination of a quasi-co-location (QCL) assumption for reception of an AP-CSI-RS, based on reported beam switch timing of UE has been under study.

However, the current NR specifications do not support all cases when the value of the reported beam switch timing is any of 14, 28, and 48. For this reason, when employing the current NR specifications, there may be cases where a TCI state (QCL assumption) of an AP-CSI-RS is failed to be appropriately determined to measure CSI, and thus an increase in communication throughput may be possibly suppressed.

Thus, an object of the present disclosure is to provide a user terminal and a radio communication method that can appropriately determine a TCI state (QCL assumption) of an AP-CSI-RS.

Solution to Problem

A user terminal according to one aspect of the present disclosure includes: a control section that determines, in a case where conditions (1) and (2) below are both satisfied, a quasi-co-location (QCL) assumption of an aperiodic channel state information-reference signal (AP CSI-RS), based on a specific control resource set (CORESET), (1) a scheduling offset between reception of a downlink control channel for communicating downlink control information scheduling the AP-CSI-RS and reception of the AP CSI-RS being less than a value of a period for a reported beam switch, and (2) in a symbol identical to a symbol of the AP-CSI-RS, there being no other downlink signals with indicated transmission configuration indication state (TCI state) or there being other downlink signals without the indicated TCI state; and a receiving section that receives the AP-CSI-RS by using the QCL assumption.

Advantageous Effects of Invention

According to one aspect of the present disclosure, the TCI state (QCL assumption) of the AP-CSI-RS can be appropriately determined.

Figure 1:
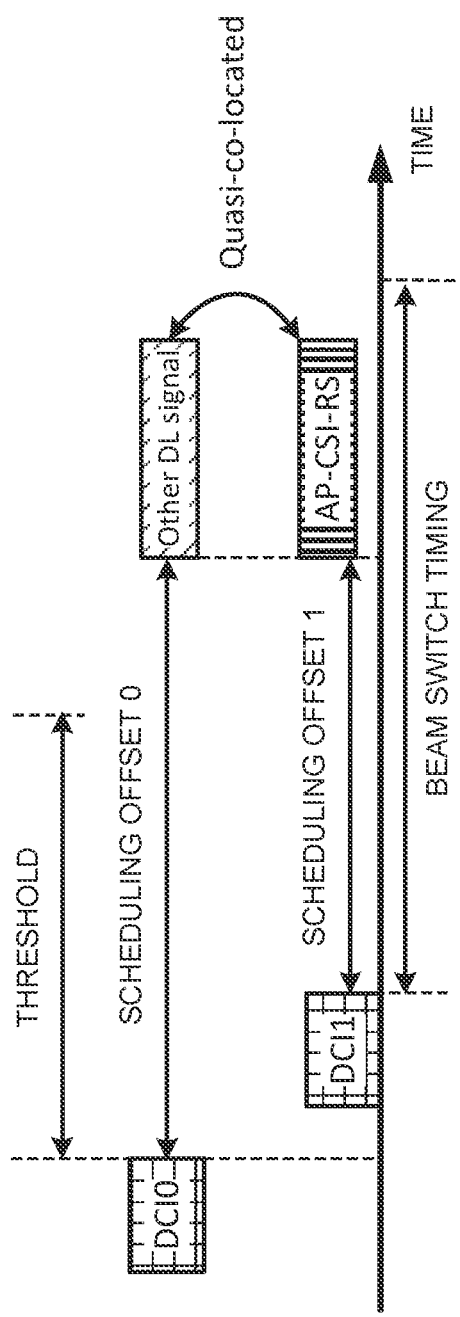
FIG. 1 is a diagram to show an example of a QCL assumption of AP CSI-RS.

DESCRIPTION OF EMBODIMENTS (TCI, QCL, Spatial Relation)

For NR, control of reception processing (e.g., at least one of reception, de-mapping, demodulation, or decoding) and transmission processing (e.g., at least one of transmission, mapping, precoding, modulation, or coding) in a UE of at least one of a signal or a channel (referred to as a "signal/channel") based on a transmission configuration indication state (a TCI state) has been under study.

The TCI state may represent one applied to a downlink signal/channel. One equivalent to a TCI state applied to an uplink signal/channel may be represented as a spatial relation.

The TCI state is information about the quasi-co-location (QCL) of the signal/channel, and may be referred to as a spatial reception parameter, spatial relation information (SRI), and the like. The TCI state may be configured for the UE for every channel or signal.

QCL is an index indicating statistical properties of the signal/channel. For example, it may mean that it can be assumed that in a case where a certain signal/channel and other signals/channels are in a QCL relationship, these different multiple signals/channels are the same in terms of at least one of a Doppler shift, a Doppler spread, an average delay, a delay spread, or a spatial parameter (e.g., the spatial reception parameter (a spatial Rx parameter)) (QCL in at least one of these).

Note that the spatial reception parameter may correspond to a reception beam (e.g., a reception analog beam) of the UE, and the beam may be specified based on spatial QCL. QCL (or at least one element of QCL) in the present disclosure may be interpreted as sQCL (spatial QCL).

Multiple types (QCL types) of QCL may be defined. For example, four QCL types A to D having different parameters (or parameter sets) may be provided, the parameter being assumed to be the same, and these parameters will be described below:

QCL Type A: the doppler shift, the doppler spread, the average delay, and the delay spread;
QCL Type B: the doppler shift and the doppler spread;
QCL Type C: the doppler shift and the average delay; and
QCL Type D: the spatial reception parameter.

The UE assuming that a certain control resource set (CORESET), channel, or reference signal is in a specific QCL (e.g., the QCL type D) relation with another CORESET, channel, or reference signal may be referred to as QCL assumption.

The UE may determine, based on the TCI state of the signal/channel or the QCL assumption, at least one of a transmission beam (a Tx beam) or a reception beam (a Rx beam) of the signal/channel.

The TCI state may be, for example, information about QCL between a target channel (or a reference signal (RS) for such a channel) and another downlink signal (e.g., another downlink reference signal (DL-RS)). The TCI state may be configured (indicated) by higher layer signaling, physical layer signaling, or a combination thereof.

In the present disclosure, for example, the higher layer signaling may be any one or combinations of radio resource control (RRC) signaling, medium access control (MAC) signaling, broadcast information, and the like.

For example, the MAC signaling may use MAC control elements (MAC CE), MAC Protocol Data Units (PDUs), and the like. For example, the broadcast information may be master information blocks (MIBs), system information blocks (SIBs), minimum system information (remaining minimum system information (RMSI)), other system information (OSI), and the like.

The physical layer signaling may be, for example, downlink control information (DCI).

The channel for which the TCI state is configured (specified) may be, for example, at least one of a downlink shared channel (a physical downlink shared channel (PDSCH)), a downlink control channel (a physical downlink control channel (PDCCH), an uplink shared channel (a physical uplink shared channel (PUSCH)), or an uplink control channel (a physical uplink control channel (PUCCH)).

The RS (DL-RS) in the QCL relation with the channel may be, for example, at least one of a synchronization signal block (SSB), a channel state information reference signal (CSI-RS), or a reference signal for measurement (a sounding reference signal (SRS)). Alternatively, the DL-RS may be the CSI-RS (also referred to as a tracking reference signal (TRS)) utilized for tracking, or may be a reference signal (also referred to as a QRS) utilized for QCL detection.

The SSB is a signal block including at least one of a primary synchronization signal (PSS), a secondary synchronization signal (SSS), or a broadcast channel (a physical broadcast channel (PBCH)). The SSB may be referred to as an SS/PBCH block.

An information element ("TCI-state IE" of RRC) of the TCI state configured by the higher layer signaling may include one or more pieces of QCL information ("QCL-Info"). The QCL information may include at least one of information (DL-RS related information) about DL-RS in the QCL relation or information (QCL type information) indicating the QCL type. The DL-RS related information may include information such as a DL-RS index (e.g., an SSB index, a non-zero-power (NZP) CSI-RS resource ID (identifier)), an index of a cell at which RS is located, and an index of a bandwidth part (BWP) at which RS is located.

<TCI State for PDCCH>

Information about QCL of PDCCH (or a demodulation reference signal (DMRS) antenna port associated with PDCCH) and certain DL-RS may be referred to as a TCI state for PDCCH, for example.

The UE may determine the TCI state for PDCCH (CORESET) specific to the UE, based on the higher layer signaling. For example, for the UE, one or more (K) TCI states may be configured for each CORESET by RRC signaling.

The UE may activate one of the plurality of TCI states configured by the RRC signaling according to the MAC CE for each CORESET. The MAC CE may be referred to as a TCI state indication for UE-specific PDCCH MAC CE. The UE may monitor a CORESET based on the active TCI state corresponding to such CORESET.

<TCI State for PDSCH>

Information about QCL of PDSCH (or a DMRS antenna port associated with PDSCH) and a certain DL-RS may be referred to as a TCI state for PDSCH, for example.

For the UE, M (M≥1) TCI states for PDSCH (M pieces of QCL information for PDSCH) may be reported (configured) by higher layer signaling. Note that the number M of TCI states configured for UE may be limited by at least one of the UE capability or the QCL type.

DCI used for scheduling of PDSCH may include a certain field (may be referred to as, for example, a TCI field or a TCI state field) indicating the TCI state for PDSCH. The DCI may be used for scheduling of PDSCH of one cell, and for example, may be referred to as DL DCI, DL assignment, DCI format 1_0, or DCI format 1_1.

Control on whether or not the TCI field is included in DCI may be performed using information reported from a base station to a UE. Such information may be information (TCI-PresentInDCI) indicating whether or not the TCI field is present (present or absent) in DCI. Such information may be configured for UE by the higher layer signaling, for example.

In a case where the TCI states exceeding eight types are configured for UE, the eight types of TCI states or less may be activated (or specified) using a MAC CE. The MAC CE may be referred to as TCI states activation/deactivation for UE-specific PDSCH MAC CE. The value of the TCI field in DCI may indicate one of the TCI states activated by MAC CE.

(CSI)

In NR, the UE measures a channel state by using a certain reference signal (or a resource for such a reference signal), and feeds back (reports) channel state information (CSI) to a base station.

The UE may measure the channel state by using, a CSI-RS, an SS/PBCH block, a DMRS, or the like as the reference signal.

As a CSI feedback method, a periodic CSI (P-CSI) reporting, an aperiodic CSI (AP-CSI or A-CSI) reporting, a semi-persistent CSI (SP-SCI) reporting, and the like have been under study.

The SP-CSI reporting (a PUCCH-based SP-CSI reporting) using a PUCCH may be activated by the MAC CE. The SP-CSI reporting (a PUSCH-based SP-CSI reporting) using a PUSCH, the AP-CSI reporting using a PUSCH or a PUCCH, and the like may be activated (or triggered) by DCI.

For example, by a CSI request field included in DCI, one trigger state may be specified from a plurality of trigger states configured by the higher layer signaling (e.g., the RRC signaling). Note that the CSI request field and a CSI trigger field may be interchangeably interpreted.

The CSI-RS measured for the AP-CSI reporting may be referred to as the AP CSI-RS (or A-CSI-RS) (Aperiodic CSI-RS). In the AP-CSI reporting, measurement of AP-CSI-RS and the AP-CSI reporting are simultaneously triggered using DCI, and therefore, the CSI reporting can be dynamically triggered while an RS resource and an uplink channel resource are efficiently used.

A list of the trigger states for the AP-CSI reporting may be configured by using an RRC information element ("CSI-AperiodicTriggerStateList"). Each trigger state may be associated with one or more report configuration IDs (CSI-ReportConfigId), CSI resource configuration information, the TCI state (or the QCL assumption) of AP-CSI-RS, and the like.

For an AP-CSI-RS resource of a CSI-RS resource set associated with the trigger state, the UE may be indicated with QCL configuration including the RS resource of QCL and the QCL type by a higher layer signaling. For example, the TCI state (or the QCL assumption) of AP-CSI-RS may be specified by (a CSI request field of) DCI triggering measurement of AP-CSI-RS.

A period from the DCI to the AP CSI-RS indicated by the DCI may be specified in association with the above-described trigger state. For example, the UE determines, based on the trigger state, a CSI-RS resource set ID corresponding to the CSI-RS resource set that is a measurement target. This CSI-RS resource set ID may be associated with an aperiodic triggering offset. The aperiodic triggering offset may be interpreted as a scheduling offset.

The scheduling offset may mean an offset between the last symbol of a PDCCH (or the last slot including the PDCCH) communicating DCI for triggering the AP CSI-RS resource set and the first symbol (or slot) of the AP-CSI-RS resource of the resource set. As the AP CSI-RS scheduling offset, a value of equal to or greater than 0 and equal to or less than 4 may be configured, or a value greater than 4 may be configured, for example. Information on the AP CSI-RS scheduling offset may correspond to "aperiodicTriggering-Offset" of an RRC parameter.

Note that in the present disclosure, the scheduling offset may mean a period from reception (e.g., the last symbol) of a certain DCI (PDCCH) to the start (e.g., the first symbol) of the signal or the channel scheduled (or triggered) by the DCI. The scheduling offset may be interpreted as, a period for scheduling, a period from a PDCCH to the signal/channel to be scheduled, or the like.

Definition of the UE capability about beam switching timing has been under study. The UE capability may be referred to as the AP-CSI-RS beam switching timing, or may be merely referred to as beam switching timing, beam switching timing (an RRC parameter "beamSwitchTiming"), or the like.

The beam switching timing may be defined by the minimum time (e.g., the number of OFDM symbols) between the DCI triggering the AP CSI-RS and transmission of the AP CSI-RS. The beam switching timing may indicate time from the last symbol having received the above-described DCI to the first symbol of AP CSI-RS triggered by the DCI. The beam switch timing may be, for example, based on a delay in decoding of PDCCH and beam switching.

The beam switch timing may be applied to at least one of a first frequency band (FR2: frequency range 2) and a second frequency band (FR2: frequency range 2). For example, FR1 may be a frequency band of 6 GHz or less (sub-6 GHz), and FR2 may be a frequency band which is higher than 24 GHz (above-24 GHz). Note that the frequency bands, definitions, and the like of FR1 and FR2 are not limited to above.

The beam switch timing may be a value varying according to a subcarrier spacing (e.g., 60 kHz, 120 kHz).

The beam switch timing may be a value such as 14, 28, 48, 224, or 336 symbols, for example. A relatively-great value of 0.336 symbols has been, in a case where a UE is equipped with a multi-panel, under study considering the time for switching the power of the panel receiving the AP CSI-RS from OFF to ON. This is because a panel for a non-activated beam can be powered off by the UE.

In the specifications of NR having been under study, in a case where the scheduling offset of AP-CSI-RS is equal to or greater than the reported beam switch timing of UE and the value of the reported beam switch timing is any of 14, 28, and 48, the UE may be expected to apply the QCL assumptions in the indicated TCI states for the aperiodic CSI-RS resources in the CSI triggering state indicated by the CSI trigger (request) field in DCI (the UE is expected to apply the QCL assumptions in the indicated TCI states for the aperiodic CSI-RS resources in the CSI triggering state indicated by the CSI trigger field in DCI). In other words, in this case, the UE may receive the AP-CSI-RS, based on the TCI state specified by the DCI.

In a case where the scheduling offset of AP-CSI-RS is less than the reported beam switching timing of UE and the value of the reported beam switch timing is any of 14, 28, and 48, if there are other DL signals having the indicated TCI states in the same symbol as that of AP-CSI-RS, the UE may apply the QCL assumptions of these other DL signals in reception of AP-CSI-RS. This specifies that the TCI state of AP-CSI-RS is not controlled by DCI for triggering the AP-CSI-RS. This is because it takes time to switch the reception beam of UE after demodulation of DCI, and such switching cannot be completed by reception of AP-CSI-RS.

Note that such other DL signals as described herein may be at least one of a PDSCH having a scheduling offset of equal to or greater than a certain threshold (UE capability information "timeDurationForQCL") (i.e., the offset until the start of reception of PDSCH scheduled by DCI after reception of DCI is equal to or greater than the certain threshold), the AP-CSI-RS having a scheduling offset equal to or greater than any beam switching timing of 14, 28, and 48 reported by the UE (i.e., another AP-CSI-RS), a P-CSI-RS, or an SP-CSI-RS.

timeDurationForQCL may be defined by the minimum time (e.g., the number of OFDM symbols) for receiving a PDCCH by the UE and applying spatial QCL information on the PDCCH (DCI) for PDSCH processing. The beam switching timing may indicate time from the last symbol having received the above-described DCI to the first symbol of AP CSI-RS triggered by the DCI. timeDurationForQCL may be referred to as Threshold-Sched-Offset as a physical layer parameter. timeDurationForQCL may be a value such as 7, 14, or 28 symbols.

Note that applicability of the QCL assumptions of the above-described other DL signals to the AP-CSI-RS may be limited to a case where an NZP CSI-RS resource set defining the AP-CSI-RS resource does not have higher layer parameters "trs-Info" and "repetition."

In the NZP CSI-RS resource set that trs-Info is configured as true, antenna ports of all NZP CSI-RS resources of the resource set may be the same as each other. For the NZP CSI-RS resource set that Repetition is configured as off, the UE does not necessarily assume that the NZP CSI-RS resources in the resource set are transmitted by the same downlink spatial domain transmit filter.

FIG. 1 is a diagram to show an example of the QCL assumption of AP CSI-RS. FIG. 1 shows the example where DCI 1 schedules (triggers) the AP-CSI-RS and DCI 0 schedules other DL signals with the same symbols as those of the AP-CSI-RS. The UE has reported, as the value of the beam switch timing, any of 14, 28, and 48 to a network with such a value being included in the UE capability information.

In FIG. 1, the scheduling offset 1 of DCI 1 and the AP CSI-RS is less than the beam switch timing. On the other hand, the scheduling offset 0 of DCI 0 and the other DL signals is equal to or greater than a threshold. In this case, the UE may apply the QCL assumptions of the other DL signals to reception of AP CSI-RS.

Note that the reception timing of DCI 0 and DCI 1 of FIG. 1 is not limited to above. Each embodiment of the present disclosure can be also applied to a case where the reception timing is the same between DCI scheduling the AP-CSI-RS and DCI scheduling other DL signals.

Note that in the present disclosure, the threshold for the other DL signals may be the beam switch timing in a case where the other DL signals are the AP-CSI-RS, and may be the value of timeDurationForQCL reported by the UE in a case where the other DL signals are a PDSCH.

However, the current NR specifications described above do not support all cases when the scheduling offset of AP-CSI-RS is less than the beam switch timing reported by the UE and the value of the reported beam switch timing is any of 14, 28, and 48. For this reason, when employing the current NR specifications, there may be cases where a TCI state (QCL assumption) of an AP-CSI-RS is failed to be appropriately determined to measure CSI, and thus an increase in communication throughput may be possibly suppressed.

For this reason, the inventors of the present invention came up with the method for appropriately determining the TCI state (the QCL assumption) of AP-CSI-RS.

Embodiments according to the present disclosure will be described in detail with reference to the drawings as follows. The radio communication method according to each embodiment may be employed independently or may be employed in combination.

Note that in the present disclosure, a panel, an uplink (UL) transmit entity, TRP, a demodulation reference signal (DMRS) port, a DMRS port group, a code division multiplexing (CDM) group, a PDSCH, a codeword, a base station, and the like may be interchangeably interpreted. A panel identifier (ID) and the panel may be interchangeably interpreted. TRP ID and TRP may be interchangeably interpreted. ID and an index may be interchangeably interpreted.

In the present disclosure, a case where the value of the beam switching timing reported by the UE is any of 14, 28, and 48 is assumed, but this value may be interpreted as a value of less than 100, for example.

(Radio Communication Method)

First Embodiment

In a first embodiment, a case where the scheduling offset of AP-CSI-RS is less than beam switch timing reported by the UE and there are no other DL signals (e.g., PDSCH, AP-CSI-RS, P-CSI-RS, SP-CSI-RS) having indicated TCI states in the same symbols as those of AP-CSI-RS will be described.

In this case, the UE may assume that the QCL assumption of AP CSI-RS is derived from the CORESET having the lowest CORESET-ID in the latest slot in which one or more CORESETs in an active BWP of a serving cell are monitored by the UE and associated with a monitored search space.

If there is no any other DL signal with an indicated TCI states in the same symbols as those of AP-CSI-RS, the UE may apply, to the AP-CSI-RS, the QCL assumption of the CORESET associated with a monitored search space with the lowest CORESET-ID in the latest slot in which one or more CORESETs within the active BWP of the serving cell are monitored by the UE (if there is no any other DL signal with an indicated TCI state in the same symbols as the CSI-RS, the UE applies the QCL assumption of the CORESET associated with a monitored search space with the lowest CORESET-ID in the latest slot in which one or more CORESETs within the active BWP of the serving cell are monitored by the UE).

If there is no any other DL signal with an indicated TCI state in the same symbols as those of AP-CSI-RS, the UE may assume that the AP-CSI-RS of a serving cell are QCL with the reference signal(s) (RS(s)) in the TCI state with respect to the QCL parameter(s) used for PDCCH QCL indication of the CORESET associated with a monitored search space with the lowest CORESET-ID in the latest slot in which one or more CORESETs within the active BWP of the serving cell are monitored by the UE (if there is no any other DL signal with an indicated TCI state in the same symbols as the CSI-RS, the UE may assume that the A-CSI-RS of a serving cell are quasi co-located with the RS(s) in the TCI state with respect to the QCL parameter(s) used for PDCCH quasi co-location indication of the CORESET associated with a monitored search space with the lowest CORESET-ID in the latest slot in which one or more CORESETs within the active BWP of the serving cell are monitored by the UE).

Note that in a case where as the other DL signals having the indicated TCI states in the same symbols as those of AP-CSI-RS, any of a PDSCH having a scheduling offset of equal to or greater than a certain threshold (UE capability information "timeDurationForQCL"), an AP-CSI-RS having a scheduling offset of equal to or greater than any beam switch timing of 14, 28, and 48 reported by the UE, a P-CSI-RS, and an SP-CSI-RS is not present, the UE may apply the QCL assumption of the above-described CORESET to the AP-CSI-RS.

Note that in the present disclosure, a CORESET-ID may be an ID (an ID for identifying a CORESET) configured by an RRC information element "ControlResourceSet." In the present disclosure, the "lowest CORESET-ID" may be interpreted as a specific CORESET-ID (e.g., the lowest CORESET-ID, the maximum CORESET-ID).

In the present disclosure, the "latest slot" may mean the latest slot after the timing of receiving the AP-CSI-RS to be scheduled, or may mean the latest slot after the timing of receiving DCI (PDCCH) for scheduling the AP-CSI-RS. Alternatively, the UE may utilize, not limited to the latest slot, a CORESET corresponding to a specific CORESET-ID in an arbitrary slot in determination of the QCL assumption of AP-CSI-RS. For example, the "CORESET having the lowest CORESET-ID in the latest slot in which one or more CORESETs in the active BWP of the serving cell are monitored and associated with the monitored search space"

may be interpreted as a "specific CORESET" (e.g., a CORESET with a specific CORESET-ID) not limited to the slot.

Figure 2:
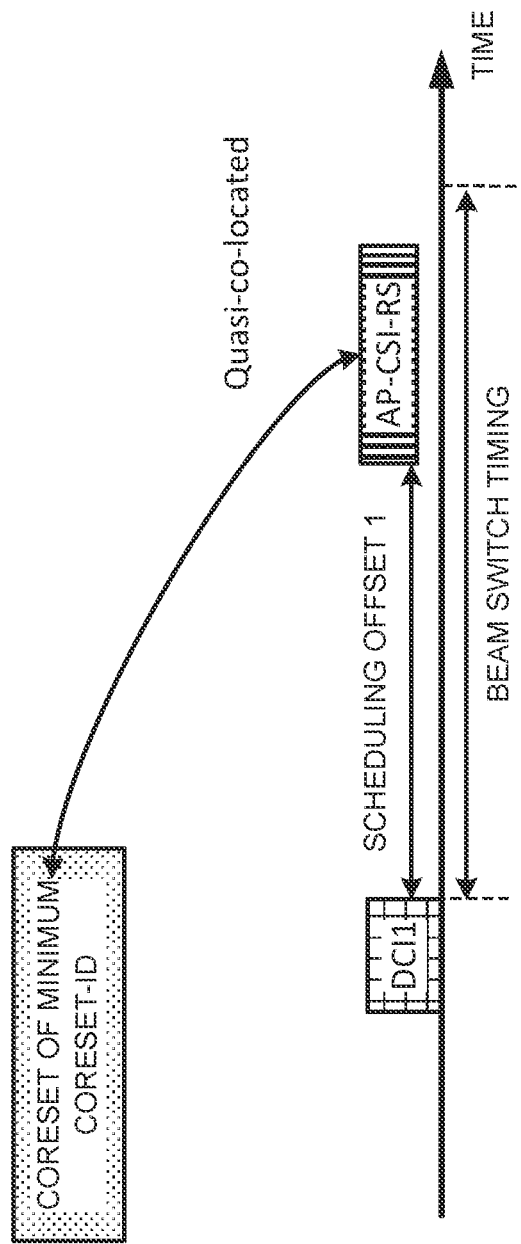
FIG. 2 is a diagram to show an example of a QCL assumption of AP CSI-RS according to a first embodiment.

FIG. 2 is a diagram to show an example of the QCL assumption of AP CSI-RS according to the first embodiment. FIG. 2 shows the example where DCI 1 schedules (triggers) the AP-CSI-RS.

In FIG. 2, scheduling offset 1 of DCI 1 and AP CSI-RS is less than the beam switch timing. In the same symbols as those of AP-CSI-RS, there are no other DL signals having the indicated TCI states. In this case, the UE may apply the QCL assumption of CORESET having the lowest CORESET-ID in the above-described latest slot and associated with the monitored search space to reception of AP CSI-RS.

According to the first embodiment described above, even in a case where the scheduling offset about AP CSI-RS is less than the beam switch timing and there are no other DL signals having the indicated TCI states, the QCL assumption of AP CSI-RS can be determined based on a certain CORESET, and reception of AP CSI-RS can be preferably performed by utilizing the QCL assumption.

Second Embodiment

In a second embodiment, a case where the scheduling offset of AP-CSI-RS is less than beam switch timing reported by the UE and there is any other DL signal without an indicated TCI state (if there is any other DL signal without an indicated TCI state) in the same symbols as those of AP-CSI-RS will be described.

Note that the "other DL signal(s) without the indicated TCI state(s)" may be interpreted as at least one of a PDSCH having a scheduling offset of equal to or less than a certain threshold (UE capability information "timeDurationForQCL") and an AP-CSI-RS having a scheduling offset of equal to or less than any beam switch timing of 14, 28, and 48 reported by the UE.

In this case, the UE may assume that the QCL assumption of AP CSI-RS is derived from the CORESET having the lowest CORESET-ID in the latest slot in which one or more CORESETs in an active BWP of a serving cell are monitored by the UE and associated with a monitored search space.

In a case where there are the other DL signals without the indicated TCI states in the same symbols as those of AP-CSI-RS, the UE may apply, to the AP-CSI-RS, the QCL assumption of CORESET having the lowest CORESET-ID in the latest slot in which one or more CORESETs in the active BWP of the serving cell are monitored by the UE and associated with the monitored search space.

In a case where there are the other DL signals without the indicated TCI states in the same symbols as those of AP-CSI-RS, the UE may assume that the AP-CSI-RS of the serving cell is QCL with a reference signal (RS) in the TCI state about a QCL parameter used for indicating QCL of PDCCH in the CORESET associated with the monitored search space and having the lowest CORESET-ID in the latest slot in which one or more CORESETs in the active BWP of the serving cell are monitored by the UE.

Figure 3:
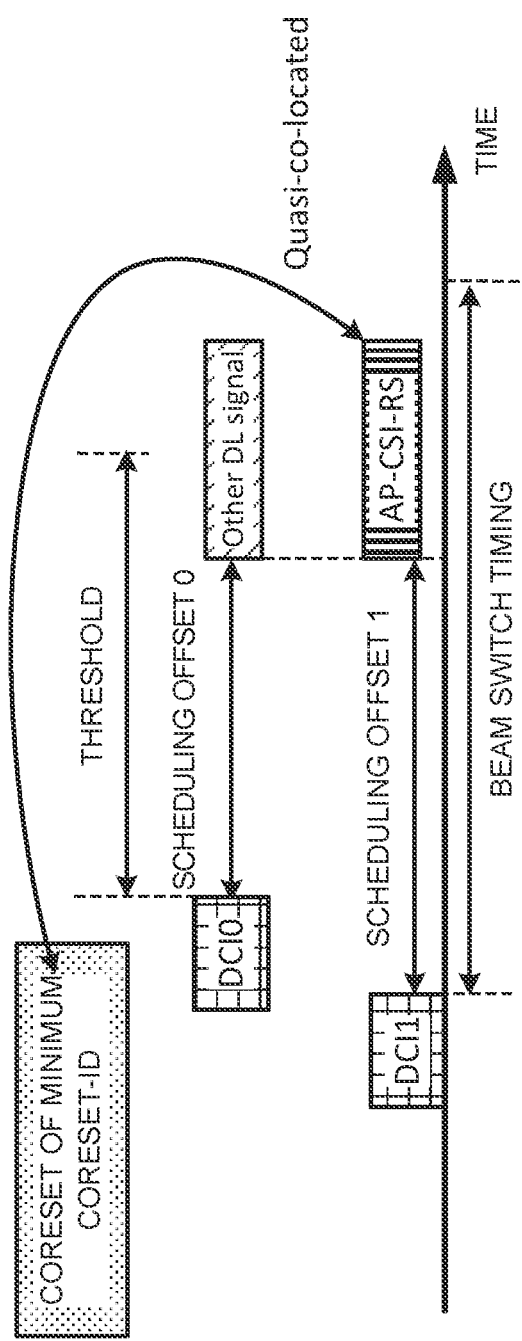
FIG. 3 is a diagram to show an example of a QCL assumption of AP CSI-RS according to a second embodiment.

FIG. 3 is a diagram to show an example of the QCL assumption of AP CSI-RS according to the second embodiment. FIG. 3 shows the example where DCI 1 schedules (triggers) the AP-CSI-RS and DCI 0 schedules other DL signals with the same symbols as those of the AP-CSI-RS.

In FIG. 3, scheduling offset 1 of DCI 1 and AP CSI-RS is less than the beam switch timing. The scheduling offset 0 of DCI 0 and the other DL signals is equal to or less than a threshold. In this case, the UE may apply the QCL assumption of CORESET having the lowest CORESET-ID in the above-described latest slot and associated with the monitored search space to reception of AP CSI-RS.

According to the second embodiment described above, even in a case where the scheduling offset about AP CSI-RS is less than the beam switch timing and there are other DL signals without the indicated TCI states, the QCL assumption of AP CSI-RS can be determined based on a certain CORESET, and reception of AP CSI-RS can be preferably performed by utilizing the QCL assumption.

Third Embodiment

In a third embodiment, a case where the scheduling offset of AP-CSI-RS is less than beam switch timing reported by the and there are other DL signals in the same symbols as those of AP-CSI-RS will be described.

In this case, the UE may apply the QCL assumptions of the other DL signals in reception of AP-CSI-RS regardless of whether or not the other DL signals have indicated TCI states.

In a case where there is any other DL signal regardless with or without an indicated TCI state in the same symbols as those of the AP-CSI-RS, the UE may apply the QCL assumptions of the other DL signals in reception of the AP-CSI-RS (if there is any other DL signal regardless with or without an indicated TCI state in the same symbols as the CSI-RS, the UE applies the QCL assumption of the other DL signal also when receiving the aperiodic CSI-RS).

In other words, the "other DL signal(s)" in the third embodiment may be interpreted as at least one of a PDSCH not relating to whether or not the PDSCH has a scheduling offset of equal to or greater than a certain threshold (e.g., UE capability information "timeDurationForQCL"), an AP-CSI-RS not relating to whether or not the AP-CSI-RS has a scheduling offset of equal to or greater than any beam switch timing of 14, 28, and 48 reported by the UE, a P-CSI-RS, and an SP-CSI-RS.

Here, the PDSCH not relating to whether or not the PDSCH has a scheduling offset of equal to or greater than the certain threshold may be interpreted as a PDSCH having a scheduling offset not relating to whether or not the scheduling offset is less than the certain threshold. The AP-CSI-RS not relating to whether or not the AP-CSI-RS has a scheduling offset of equal to or greater than the above-described beam switch timing reported by the UE may be interpreted as an AP-CSI-RS having a scheduling offset not relating to whether or not the scheduling offset is less than the above-described beam switch timing.

In the case of employing the third embodiment, the "other DL signals having the indicated TCI states" as defined in the NR specifications may be merely defined as the "other DL signals," and it may be defined that these other DL signals refer to a PDSCH, an AP-CSI-RS, a P-CSI-RS, and an SP-CSI-RS. In other words, limitations on the scheduling offset may be eliminated from a PDSCH and an AP-CSI-RS as the other DL signals.

According to the third embodiment described above, in a case where the scheduling offset about AP CSI-RS is less than the beam switch timing and there are the other DL signals, the QCL assumption of AP CSI-RS can be determined based on these other DL signals regardless of whether or not the other DL signals have the indicated TCI states, and reception of AP CSI-RS can be preferably performed by utilizing the QCL assumption.

Other Embodiments

In each of the above-described embodiments, the example where the UE applies, to an AP-CSI-RS, the QCL assumption of certain CORESET having the lowest CORESET-ID in the latest slot has been described. This "certain CORESET having the lowest CORESET-ID in the latest slot" may be interpreted as DCI (PDCCH) (or the CORESET including the PDCCH) triggering (scheduling) an AP-CSI-RS.

Note that the beam switch timing of AP-CSI-RS and the threshold (the beam switch timing) for the other DL signals when the other DL signals are the AP-CSI-RS may be different values. For example, in a case where the AP-CSI-RS and the other DL signals are transmitted or received using cells or panels different from each other, the beam switch timings for these may be different from each other.

In each of the above-described embodiments and the current NR specifications, some configurations for determining the QCL assumption of AP CSI-RS, based on the other DL signals with the same symbols as those of the AP-CSI-RS have been described. At least one of the following (A) to (C) may be added to the conditions for determining the QCL assumption of AP CSI-RS, based on the other DL signals as described about at least one of the above-described embodiments and the current NR specifications:

(A) the time resources of AP-CSI-RS and other DL signals overlap (or coincident) with each other by at least one symbol;

(B) the time resources of AP-CSI-RS and other DL signals overlap (or coincident) with each other by all symbols of AP-CSI-RS; and (C) the time resources of AP-CSI-RS and other DL signals overlap (or coincident) with each other by all symbols of the other DL signals.

In other words, in the case of further satisfying at least one of (A) to (C) above, the UE may determine the QCL assumption of AP CSI-RS, based on the other DL signals with the same symbols as those of AP-CSI-RS, and if not, may assume that the QCL assumption is of a default. Here, the default QCL assumption may be the QCL assumption applied to CORSET having the lowest CORESET-ID in the latest slot in which one or more CORESETs in the active BWP of the serving cell are monitored and associated with the monitored search space.

The above-described (B) is not satisfied in a case where the time resource of AP-CSI-RS is longer than the time resources of the other DL signals, for example. The above-described (C) is not satisfied in a case where the time resource of AP-CSI-RS is shorter than the time resources of the other DL signals, for example.

These conditions are taken into consideration, and therefore, for example, in a case where the multiple other DL signals are received in the same symbols as those of AP-CSI-RS, the more-appropriate QCL assumptions of the other DL signals can be applied to the AP-CSI-RS.

(Radio Communication System)

Hereinafter, a structure of a radio communication system according to one embodiment of the present disclosure will be described. In this radio communication system, communication is performed using any of the radio communication methods according to each embodiment of the present disclosure described above or a combination thereof.

Figure 4:
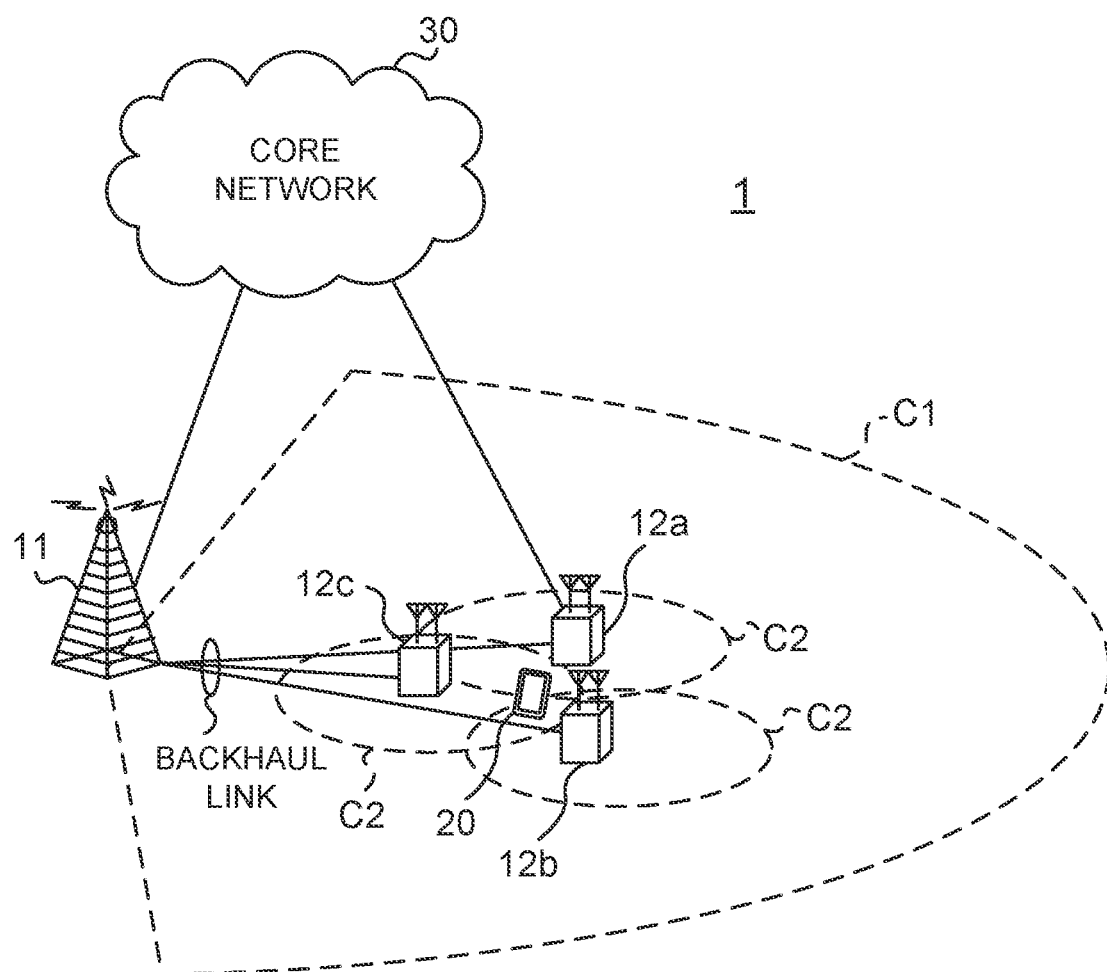
FIG. 4 is a diagram to show an example of a schematic structure of a radio communication system according to one embodiment.

FIG. 4 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 5:
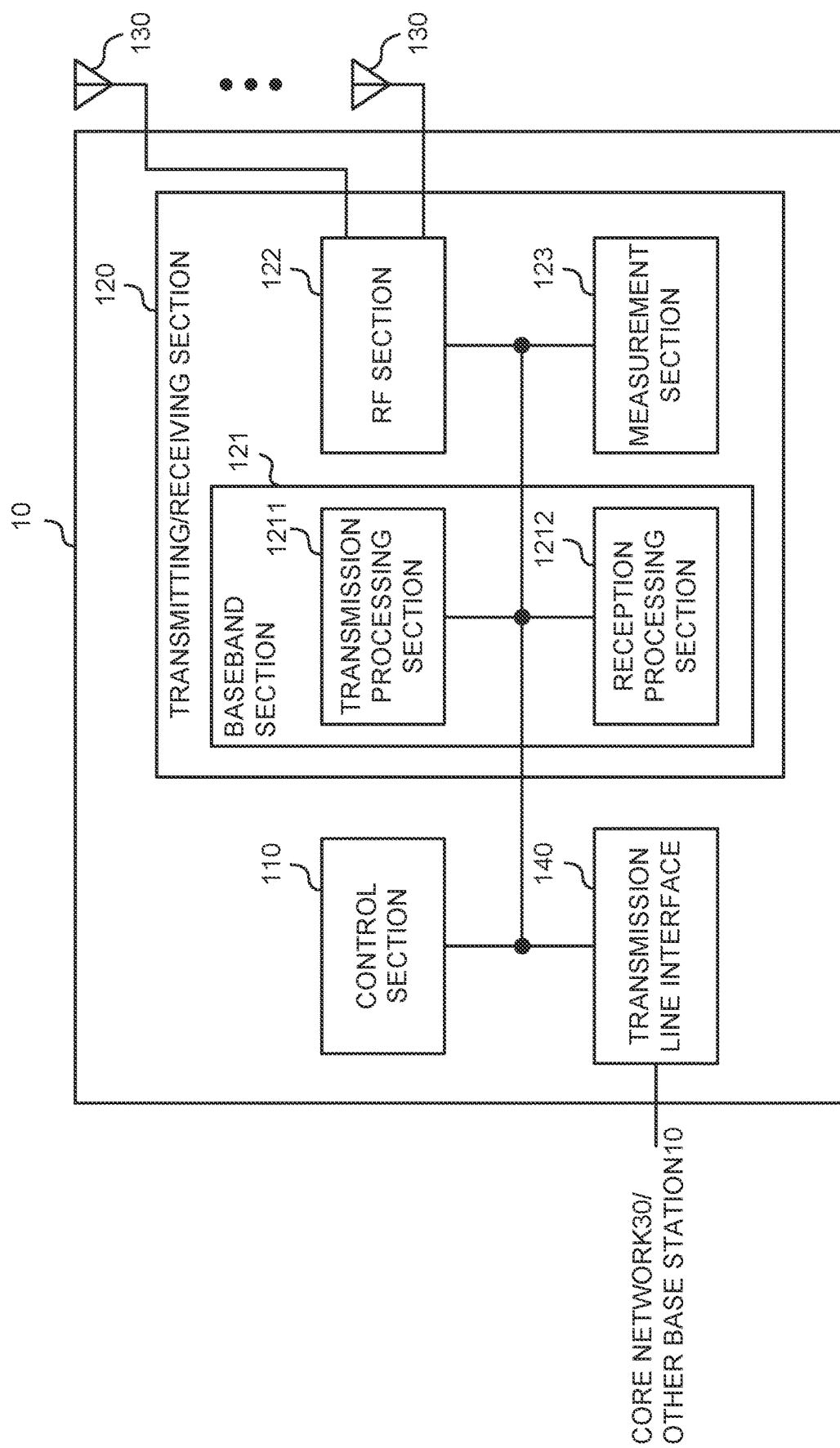
FIG. 5 is a diagram to show an example of a structure of a base station according to one embodiment.

FIG. 5 is a diagram to show an example of a structure of the base station according to one embodiment. The base station 10 includes a control section 110, a transmitting/receiving section 120, transmitting/receiving antennas 130 and a communication path interface 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam forming (for example, precoding), analog beam forming (for example, phase rotation), and so on.

The transmitting/receiving section 120 (transmission processing section 1211) may performs the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may performs transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit, to the user terminal 20, the AP-CSI-RS, other DL signals, and the like.

(User Terminal)

Figure 6:
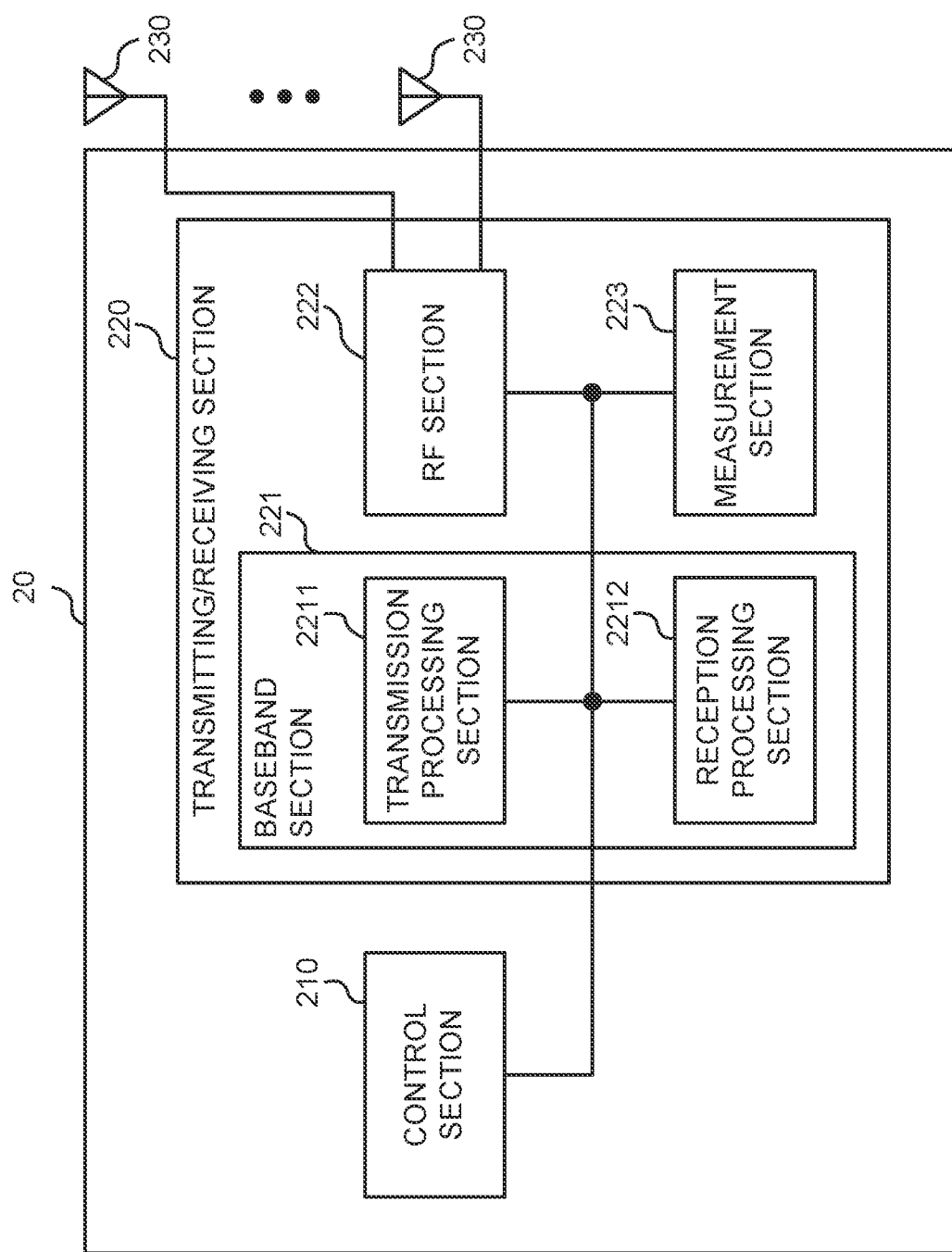
FIG. 6 is a diagram to show an example of a structure of a user terminal according to one embodiment.

FIG. 6 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be constituted as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (the measurement section 223) may perform measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that in the case of satisfying both of conditions (1) and (2) below, the control section 210 may determine a Quasi-Co-Location (QCL) assumption of an aperiodic channel state information-reference signal (AP CSI-RS), based on a specific control resource set (CORESET).

Here, (1) a scheduling offset between reception of a downlink control channel (PDCCH) for communicating downlink control information (DCI) scheduling the AP-CSI-RS and reception of the AP CSI-RS is less than the value (e.g., the value of an RRC parameter "beamSwitchTiming," and any of 14, 28, and 48) of a period for a reported beam switch; and (2) in the same symbols as those of AP-CSI-RS, there are no other downlink signals (DL signals) having indicated transmission configuration indication state (TCI states) or there are other downlink signals without the indicated TCI states.

The above-described specific control resource set may be a specific CORESET in the latest slot (e.g., CORESET with the lowest CORESET-ID in the latest slot), a specific CORESET in a certain slot, or a specific CORESET (e.g., among configured CORESETs, a CORESET with the lowest CORESET-ID, a CORESET in a specific TCI state or QCL assumption) in an arbitrary slot.

The transmitting/receiving section 220 may receive the AP-CSI-RS by using the QCL assumption based on the CORESET.

Note that the other downlink signals without the indicated TCI states may be at least one of a physical downlink shared channel (PDSCH) having a scheduling offset of less than a certain threshold or an AP-CSI-RS having a scheduling offset less than the period for the beam switch.

Note that the control section 210 may determine the QCL assumption of AP CSI-RS, according to the default QCL assumption of PDSCH in the case of satisfying both the conditions (1) and (2) above.

The beam switch timing of the present disclosure may be represented as a certain threshold (e.g., a threshold different from timeDurationForQCL).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 7:
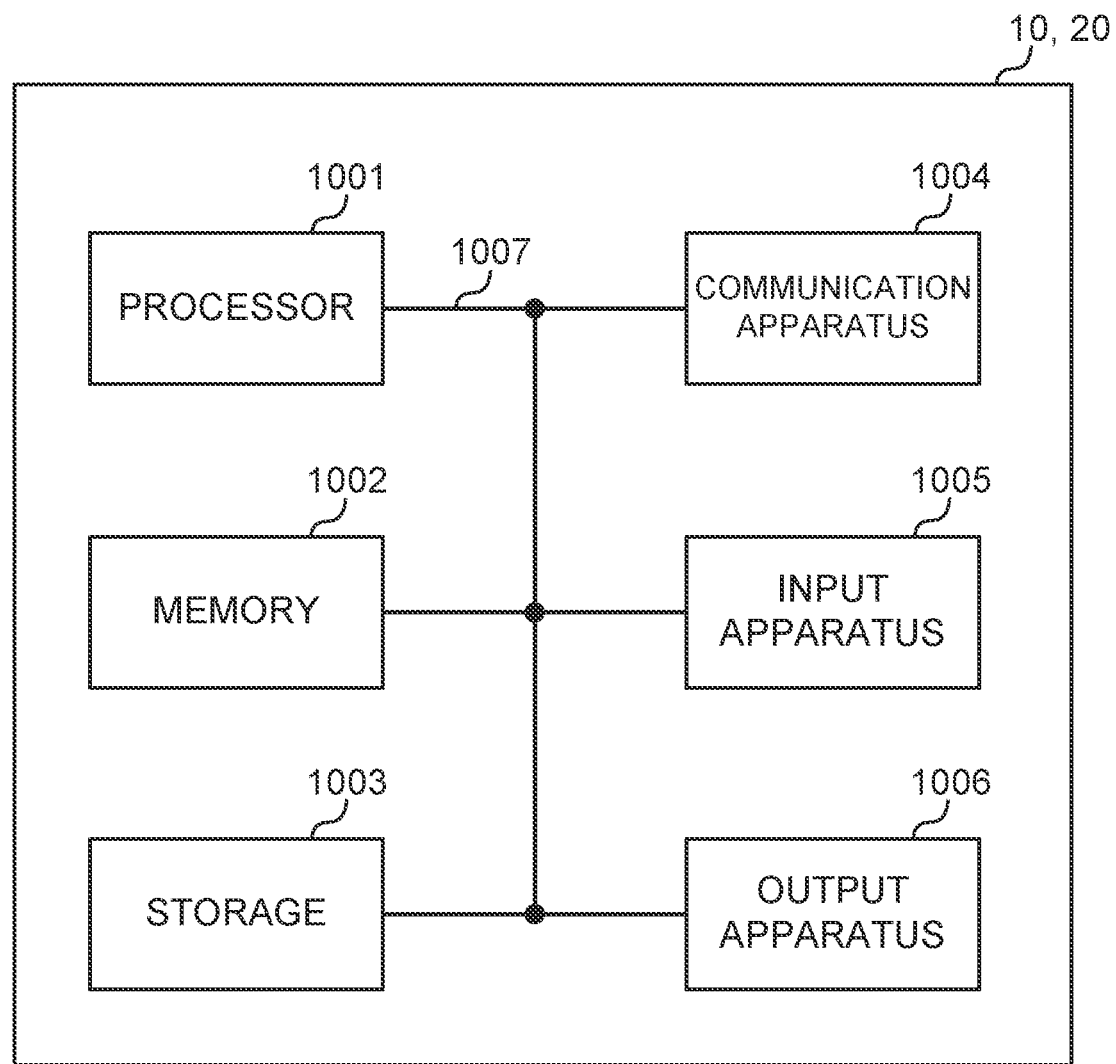
FIG. 7 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 7 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of PBs may be referred to as a "physical resource block (Physical RB (PPJB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be indicated by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding wait)," "quasi-co-location (QCL)," a "Transmission Configuration Indication state (TCI state)," a "spatial relation," a "spatial domain filter," a "transmission power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
  a control section that determines, a quasi-co-location (QCL) assumption of an aperiodic channel state information-reference signal (AP-CSI-RS), based on a control resource set (CORESET) corresponding to a lowest CORESET-ID among CORESET-IDs in a slot in which one or more CORESETs are monitored, in a case where:
    (1) a scheduling offset between reception of a downlink control channel for communicating downlink control information scheduling the AP-CSI-RS and reception of the AP-CSI-RS is less than a value of reported beam switch timing, and the reported beam switch timing is any of 14, 28 and 48, and
    (2) in a symbol identical to a symbol of the AP-CSI-RS, there are no other downlink signals with indicated transmission configuration indication state (TCI state) and in a symbol identical to a symbol of the AP-CSI-RS, there is at least one of: a physical downlink shared channel (PDSCH) having a scheduling offset of less than a threshold; and an AP-CSI-RS having a scheduling offset of less than the value of beam switch timing; and
  a receiving section that receives the AP-CSI-RS by using the QCL assumption.

2. The terminal according to claim 1, wherein the other downlink signals with the indicated TCI states are at least one of: a PDSCH having a scheduling offset of equal to or greater than the threshold; an AP-CSI-RS having a scheduling offset of equal to or greater than the value of beam switch timing; a periodic channel state information-reference signal (P-CSI-RS); and a semi-persistent channel state information-reference signal (SP-CSI-RS).

3. A radio communication method for a terminal, the radio communication method comprising:
  determining, a quasi-co-location (QCL) assumption of an aperiodic channel state information-reference signal (AP-CSI-RS), based on a control resource set (CORESET) corresponding to a lowest CORESET-ID among CORESET-IDs in a slot in which one or more CORESETs are monitored, in a case where:
    (1) a scheduling offset between reception of a downlink control channel for communicating downlink control information scheduling the AP-CSI-RS and reception of the AP-CSI-RS is less than a value of reported beam switch timing, and the reported beam switch timing is any of 14, 28 and 48, and
    (2) in a symbol identical to a symbol of the AP-CSI-RS, there are no other downlink signals with indicated transmission configuration indication state (TCI state) and in a symbol identical to a symbol of the AP-CSI-RS, there is at least one of: a physical downlink shared channel (PDSCH) having a scheduling offset of less than a threshold; and an AP-CSI-RS having a scheduling offset of less than the value of beam switch timing; and
  receiving the AP-CSI-RS by using the QCL assumption.

4. A base station comprising:
  a transmitting section that transmits, to a terminal, an aperiodic channel state information-reference signal (AP-CSI-RS); and
  a control section that assumes that, the terminal determines a quasi-co-location (QCL) assumption of the AP-CSI-RS, based on a control resource set (CORESET) corresponding to a lowest CORESET-ID among CORESET-IDs in a slot in which one or more CORESETs are monitored, in a case where:
    (1) a scheduling offset between reception of a downlink control channel for communicating downlink control information scheduling the AP-CSI-RS and reception of the AP-CSI-RS is less than a value of reported beam switch timing, and the reported beam switch timing is any of 14, 28 and 48, and
    (2) in a symbol identical to a symbol of the AP-CSI-RS, there are no other downlink signals with indicated transmission configuration indication state (TCI state) and in a symbol identical to a symbol of the AP-CSI-RS, there is at least one of: a physical downlink shared channel (PDSCH) having a scheduling offset of less than a threshold; and an AP-CSI-RS having a scheduling offset of less than the value of beam switch timing.

5. A system comprising a base station and a terminal, wherein
  the base station comprises:
    a transmitting section that transmits an aperiodic channel state information-reference signal (AP-CSI-RS); and
  the terminal comprises:
    a control section that determines, a quasi-co-location (QCL) assumption of the AP-CSI-RS, based on a control resource set (CORESET) corresponding to a lowest CORESET-ID among CORESET-IDs in a slot in which one or more CORESETs are monitored, in a case where:
      (1) a scheduling offset between reception of a downlink control channel for communicating downlink control information scheduling the AP-CSI-RS and reception of the AP-CSI-RS is less than a value of reported beam switch timing, and the reported beam switch timing is any of 14, 28 and 48, and
      (2) in a symbol identical to a symbol of the AP-CSI-RS, there are no other downlink signals with indicated transmission configuration indication state (TCI state) and in a symbol identical to a symbol of the AP-CSI-RS, there is at least one of: a physical downlink shared channel (PDSCH) having a scheduling offset of less than a threshold; and an AP-CSI-RS having a scheduling offset of less than the value of beam switch timing; and
    a receiving section that receives the AP-CSI-RS by using the QCL assumption.

* * * * *